US012776656B2

(12) United States Patent
Ninomiya et al.

(10) Patent No.: US 12,776,656 B2
(45) Date of Patent: Oct. 27, 2026

(54) CIRCUIT DEVICE AND ELECTRONIC DEVICE

(71) Applicant: SEIKO EPSON CORPORATION, Tokyo (JP)

(72) Inventors: Masaya Ninomiya, Matsumoto (JP); Kinya Matsuda, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 519 days.

(21) Appl. No.: 18/543,297

(22) Filed: Dec. 18, 2023

(65) Prior Publication Data

US 2024/0204544 A1 Jun. 20, 2024

(30) Foreign Application Priority Data

Dec. 20, 2022 (JP) ................................ 2022-203240

(51) Int. Cl.

| | |
|---|---|
| ***H01M 10/46*** | (2006.01) |
| ***H02J 7/61*** | (2026.01) |
| ***H02J 7/68*** | (2026.01) |
| ***H02J 7/80*** | (2026.01) |
| ***H02J 7/90*** | (2026.01) |

(52) U.S. Cl.

CPC ................. *H02J 7/61* (2026.01); *H02J 7/68* (2026.01); *H02J 7/80* (2026.01); *H02J 7/933* (2026.01)

(58) Field of Classification Search

CPC ...... H02J 7/61; H02J 7/80; H02J 7/933; H02J 7/663; H02J 7/68

USPC ................ 320/107, 128, 134, 136, 150, 165

See application file for complete search history.

(56) References Cited

U.S. PATENT DOCUMENTS

2024/0235183 A1* 7/2024 Lin .................... G01R 31/2628

FOREIGN PATENT DOCUMENTS

JP 2003-133571 A 5/2003

* cited by examiner

*Primary Examiner* — Edward Tso

(74) *Attorney, Agent, or Firm* — Rankin, Hill & Clark LLP

(57) ABSTRACT

A circuit device includes a charging circuit and a discharging circuit. The charging circuit is configured to supply a charging current to a battery based on a power supply voltage from a power supply node. The discharging circuit is provided on an output side of the charging circuit, and is configured to discharge a leakage current leaking from the power supply node to the output side of the charging circuit when supply of the charging current is off.

17 Claims, 11 Drawing Sheets

FIG. 4

| | VIN=6V,VBAT=1.8V NO RESISTOR IN NCSR | |
|---|---|---|
| | IVIN | IVBAT |
| 85°C | −123uA | 123uA |
| 60°C | −48uA | 48uA |
| 40°C | −20uA | 20uA |
| 25°C | −10uA | 10uA |

FIG. 5

| | VIN=6V,VBAT=1.8V COUPLE 12.5 KΩ RESISTOR TO NCSR | | VIN=6V,VBAT=4.35V, COUPLE 12.5 KΩ RESISTOR TO NCSR | |
|---|---|---|---|---|
| | IVIN | IVBAT | IVIN | IVBAT |
| 85°C | −135uA | −0.9uA | −135uA | −2.3uA |
| 60°C | −61uA | −0.5uA | −61uA | −1.9uA |
| 40°C | −28uA | −0.4uA | −28uA | −1.7uA |
| 25°C | −14uA | −0.3uA | −14uA | −1.7uA |

CIRCUIT DEVICE AND ELECTRONIC DEVICE

The present application is based on, and claims priority from JP Application Serial Number 2022-203240, filed Dec. 20, 2022, the disclosure of which is hereby incorporated by reference herein in its entirety.

BACKGROUND

1. Technical Field

The present disclosure relates to a circuit device, an electronic device, and the like.

2. Related Art

JP-A-2003-133571 discloses a charging control method for a secondary battery. In this control method, a potential difference between a bus voltage and a battery voltage is made constant.

In the charging control method disclosed in JP-A-2003-133571, in order to reduce a difference between a charging voltage and a battery voltage and increase a charging current, it is necessary to reduce on-resistance of a charging control circuit. However, when the on-resistance is reduced, a leakage current increases when the charging control circuit is turned off, and when the leakage current flows into a secondary battery in a fully charged state, the secondary battery may be overcharged.

SUMMARY

An aspect of the present disclosure relates to a circuit device. The circuit device includes: a charging circuit configured to supply a charging current to a battery based on a power supply voltage from a power supply node; and a discharging circuit provided on an output side of the charging circuit. The discharging circuit is configured to discharge a leakage current leaking from the power supply node to the output side of the charging circuit when supply of the charging current is off.

Another aspect of the present disclosure relates to an electronic device. The electronic device includes: the circuit device described above; and the battery.

BRIEF DESCRIPTION OF THE DRAWINGS

FIG. 4 is an example of temperature dependence of a value of a current flowing into a power supply node and a value of a current flowing into a charging node.

FIG. 5 is a diagram showing an effect of discharging a charge in a coupling node by a discharging circuit.

DESCRIPTION OF EMBODIMENTS

Hereinafter, the embodiment will be described. The embodiment to be described below does not unduly limit the scope of the claims. In addition, all of the components described in the embodiment are not necessarily essential components.

1. Circuit Device

Figure 1:
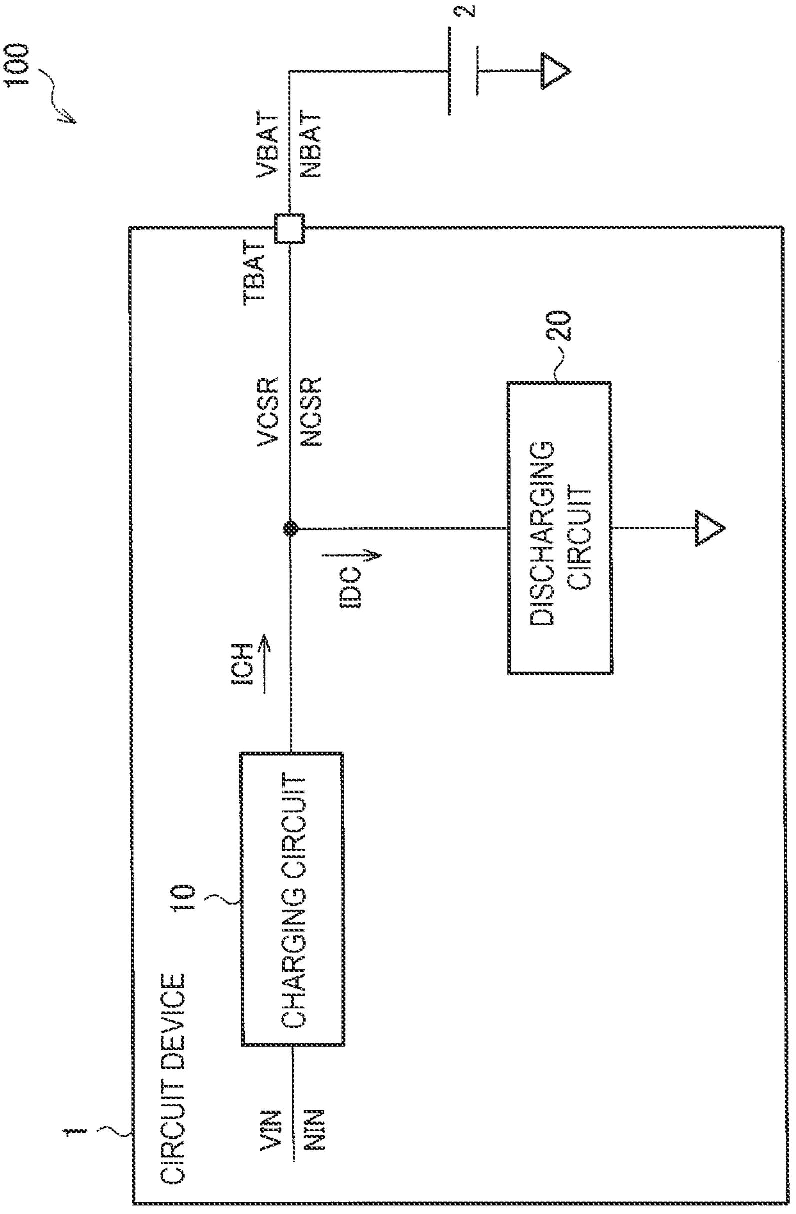
FIG. 1 is a configuration example of a circuit device according to the embodiment.

FIG. 1 is a configuration example of a circuit device 1 according to the embodiment. The circuit device 1 includes a charging circuit 10 and a discharging circuit 20. The charging circuit 10 generates a charging current ICH based on a power supply voltage VIN supplied from a power supply node NIN, and supplies the charging current ICH to an output-side node NCSR. The power supply voltage VIN is supplied from, for example, a power supply outside the circuit device 1. A battery 2, which is coupled to the outside of the circuit device 1 via a battery terminal TBAT, is charged with the charging current ICH. Here, the battery 2 is a secondary battery, for example, a lithium ion secondary battery, a nickel-hydrogen storage cell, or a nickel-metal-hydride rechargeable battery. The power supply voltage VIN is, for example, 5 V to 4 V, and a battery voltage VBAT is, for example, 4.3 V to 3.6 V.

The discharging circuit 20 discharges, to a ground node, a leakage current flowing from the charging circuit 10 to the output-side node NCSR. The ground node is a low potential-side power supply node and can also be called a VSS node. For example, when the charging circuit 10 is turned off, no charging current ICH is supplied to the output-side node NCSR, which is an output side of the charging circuit 10, but a leakage current may flow to the output-side node NCSR when the charging circuit is turned off. The discharging circuit 20 discharges the leakage current to the ground node. In this way, the discharging circuit 20 prevents a voltage VCSR at the output-side node NCSR from increasing due to the leakage current from the charging circuit 10. Therefore, the discharging circuit 20 discharges a charge flowing to the output-side node NCSR, thereby preventing the battery 2 from being overcharged with the leakage current from the charging circuit 10. Here, a current caused by the discharging circuit 20 discharging the charge in the output-side node NCSR to the ground node is referred to as a discharging current IDC. The discharging circuit 20 may be provided on the output side of the charging circuit 10, and may be provided at, for example, a node NCS1 shown in FIG. 3, which will be described later. In this case, the node NSC1 is the output-side node of the charging circuit 10.

That is, the circuit device 1 according to the embodiment includes the charging circuit 10 and the discharging circuit 20. The charging circuit 10 supplies the charging current ICH to the battery 2 based on the power supply voltage VIN from the power supply node NIN. The discharging circuit 20 is provided on the output side of the charging circuit 10, and discharges the leakage current leaking from the power supply node NIN to the output side of the charging circuit 10 when supply of the charging current ICH is off.

In the charging control method disclosed in JP-A-2003-133571, in order to reduce a difference between a charging voltage and a battery voltage and to increase a charging current, it is desirable to reduce on-resistance of a charging circuit. However, when the on-resistance is reduced, the leakage current increases when the charging circuit is turned off, the leakage current flows into the battery in a fully charged state, and the battery may be overcharged. The on-resistance of the charging circuit can be reduced by, for example, increasing a channel width W of a transistor constituting the charging circuit and reducing a channel length L thereof to reduce on-resistance of the transistor. Alternatively, the on-resistance of the charging circuit can also be reduced by lowering a threshold value of the transistor. However, when the on-resistance of the transistor constituting the charging circuit is reduced as described above, a leakage current increases when the charging circuit is turned off. The leakage current leads to continuous charging of the battery even when the battery is fully charged and the charging circuit is turned off, which may overcharge the battery and cause a failure in the battery.

In this regard, according to the circuit device 1 in the embodiment, the voltage VCSR at the output-side node NCSR to which the charging current ICH for charging the battery 2 is supplied is adjusted to be, for example, equal to or lower than the battery voltage VBAT by the discharging circuit 20, and the battery 2 can be prevented from being overcharged. For example, as described above, when a full charging voltage of the battery 2 is set to 4.3 V, the voltage VCSR at the output-side node NCSR is controlled so as not to exceed 4.3 V, thereby preventing the overcharging of the battery 2.

In the embodiment, the discharging circuit 20 discharges the leakage current after a full charge of the battery is detected.

In this way, when it is detected that the battery voltage VBAT becomes a predetermined full charging voltage, the discharging circuit 20 can discharge the leakage current from the charging circuit 10. Therefore, when the battery 2 is not yet fully charged, the battery 2 can be charged with a constant current to a predetermined full charging voltage, and control can be implemented to prevent overcharging from occurring when charging is completed.

In the embodiment, the discharging circuit 20 sets the voltage VCSR on the output side of the charging circuit 10 to be equal to or lower than the battery voltage VBAT by discharging the leakage current.

In this way, by discharging the leakage current from the charging circuit 10, the voltage VCSR at the output-side node NCSR is prevented from increasing to be higher than the battery voltage VBAT. Therefore, the voltage VCSR at the output-side node NCSR can be maintained to be equal to or lower than the battery voltage VBAT, and the battery 2 can be prevented from being overcharged. In the embodiment, the case where the discharging circuit 20 discharges the leakage current to set the voltage VCSR on the output side of the charging circuit 10 to be equal to or lower than the battery voltage VBAT includes a case where the voltage VCSR is set to be lower than the battery voltage VBAT.

Figure 2:
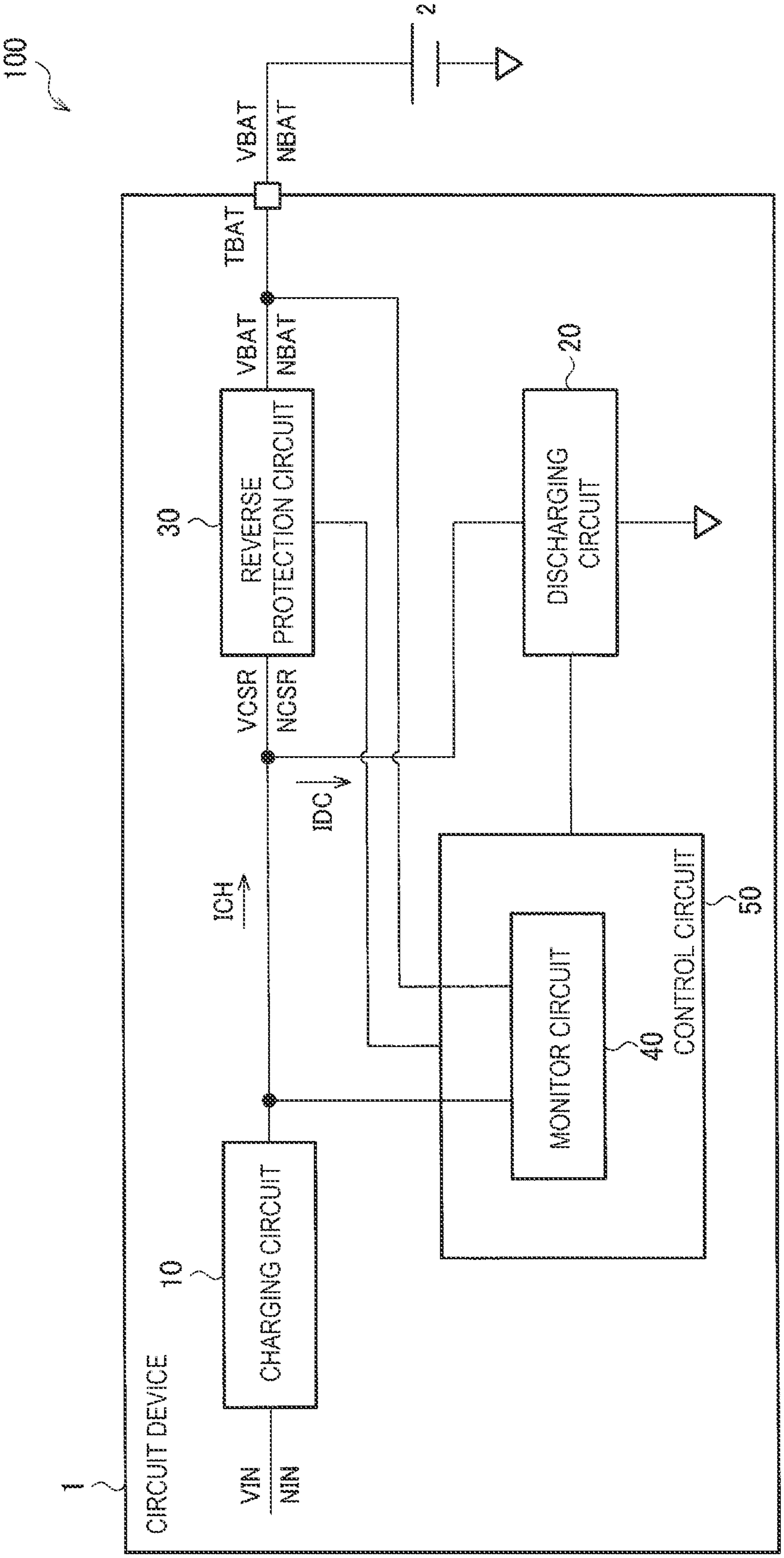
FIG. 2 is a detailed configuration example of the circuit device according to the embodiment.

FIG. 2 is a detailed configuration example of the circuit device 1 according to the embodiment. The configuration example shown in FIG. 2 is different from the circuit device 1 described in FIG. 1 in that the circuit device 1 includes a reverse protection circuit 30 and a control circuit 50. The reverse protection circuit 30 is provided between the charging circuit 10 and the battery 2. In this case, the output-side node NCSR of the charging circuit 10 becomes an input-side node of the reverse protection circuit 30.

The control circuit 50 performs various types of control including charging control and discharging control in the circuit device 1. The control circuit 50 includes a monitor circuit 40 that monitors a potential of each node of the circuit device 1. For example, when the monitor circuit 40 determines that a potential of the charging node NBAT becomes a full charging voltage, the control circuit 50 instructs the reverse protection circuit 30 to be described later to prevent the battery 2 from being discharged due to reverse flow of a charge from the battery 2 to the output-side node NCSR. The monitor circuit 40 monitors the voltage VCSR on the output side of the charging circuit 10 and the battery voltage VBAT. The control circuit 50 controls the discharging current IDC of the discharging circuit 20 based on a monitor result of the monitor circuit 40. For example, the control circuit 50 controls the discharging current IDC based on the monitor result of the monitor circuit 40 such that the voltage VCSR is equal to or lower than the battery voltage VBAT. The control of the discharging current IDC is implemented by, for example, setting a resistance value of a variable resistance circuit of the discharging circuit 20, as will be described later. In this way, the discharging control of the circuit device 1 can be implemented by the control by the control circuit 50.

Figure 3:
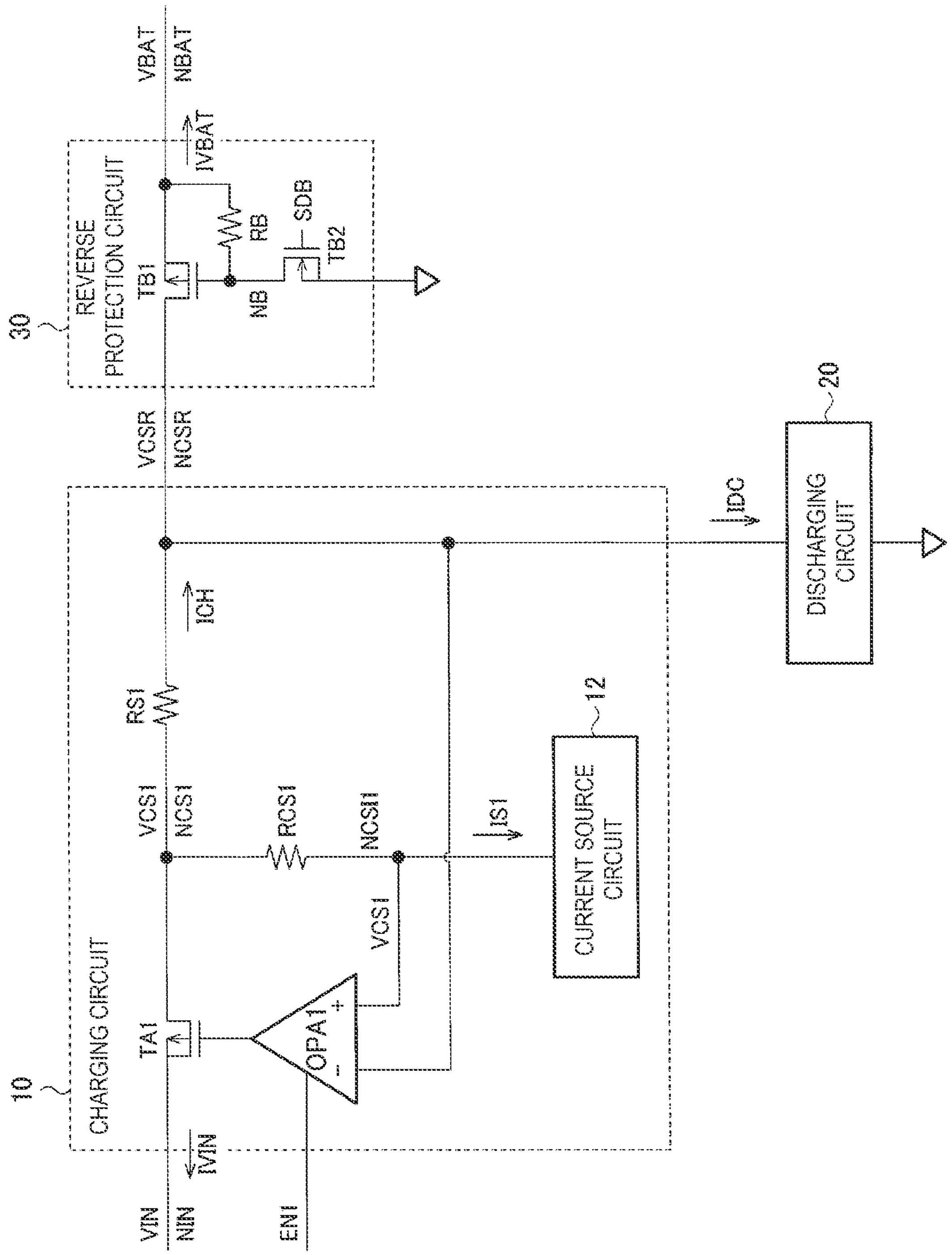
FIG. 3 is a circuit configuration example of a charging circuit and a reverse protection circuit according to the embodiment.

FIG. 3 is a diagram showing an example of a circuit configuration of the charging circuit 10 and the reverse protection circuit 30 in the circuit device 1 according to the embodiment. As shown in FIG. 3, the charging circuit 10 includes a current source circuit 12, an amplifier circuit OPA1, a transistor TA1, and resistors RCS1 and RS1. The amplifier circuit can also be called an operational amplifier.

The current source circuit 12 outputs a first output current IS1 based on a reference voltage VREF, as will be described later in FIG. 6. The first output current IS1 is a current source current generated by the current source circuit 12. The first output current IS1 is supplied to a non-inverting input terminal of the amplifier circuit OPA1 and the node NCS1 on a drain side of the P-type transistor TA1. Based on the first output current IS1, the charging current ICH is generated by the amplifier circuit OPA1, the P-type transistor TA1, and the resistors RS1 and RCS1.

A source of the transistor TA1 is coupled to the power supply node NIN, and a drain thereof is coupled to the node NCS1. The power supply voltage VIN is supplied to the power supply node NIN. One end of the resistor RCS1 is coupled to the node NCS1, and the other end thereof is coupled to a node NCSI1. One end of the resistor RS1 is coupled to the node NCS1, and the other end thereof is coupled to the output-side node NCSR. The non-inverting input terminal of the amplifier circuit OPA1 is coupled to the node NCSI1, an inverting input terminal thereof is coupled to the output-side node NCSR, and the output-side node NCSR is coupled to a gate of the P-type transistor TA1. The amplifier circuit OPA1 is enabled when a first enable signal EN1 is at a low level. Accordingly, the charging current ICH=(RCS1/RS1)×IS1 is supplied to the output-side node NCSR, and is supplied to the charging node NBAT as the charging current ICH.

The reverse protection circuit 30 includes a P-type transistor TB1, an N-type transistor TB2, and a resistor RB. A source of the P-type transistor TB1 is coupled to the charging node NBAT, and a drain thereof is coupled to the output-side node NCSR. A source of the N-type transistor TB2 is coupled to a ground node, and a drain thereof is coupled to a gate of the P-type transistor TB1. One end of the resistor RB is coupled to the charging node NBAT, and the other end thereof is coupled to the gate of the P-type transistor TB1.

First, when the battery 2 is to be charged, the control circuit 50 described in FIG. 2 turns on the N-type transistor TB2 with a control signal SDB. Accordingly, the P-type transistor TB1 is also turned on, the charging current ICH flows from the output-side node NCSR to the charging node NBAT, and the battery 2 is charged. When charging of the battery 2 is to be stopped, the control circuit 50 turns off the N-type transistor TB2 with the control signal SDB. Accordingly, the P-type transistor TB1 is also turned off, and the reverse protection circuit 30 prevents reverse flow of a charge from the battery 2 to the charging circuit 10.

That is, the circuit device 1 according to the embodiment includes the reverse protection circuit 30 that is provided between the charging circuit 10 and the battery 2 and that prevents the reverse flow from the battery 2 to the charging circuit 10. The discharging circuit 20 is coupled to an input-side node of the reverse protection circuit 30. In FIG. 3, the output-side node NCSR of the charging circuit 10 becomes the input-side node of the reverse protection circuit 30.

In this way, the reverse protection circuit 30 provided between the charging circuit 10 and the battery 2 can prevent a charge from flowing from the battery 2 to the output-side node NCSR.

In the embodiment, the charging circuit 10 includes the transistor TA1 provided between the power supply node NIN and the output of the charging circuit 10, and the amplifier circuit OPA1 that controls a gate voltage of the transistor TA1. When the supply of the charging circuit 10 is off, the transistor TA1 is off. The discharging circuit 20 discharges a leakage current leaking from the power supply node NIN to the output of the charging circuit 10 via the transistor TA1 that is off.

In this way, the amplifier circuit OPA1 can control the gate voltage of the transistor TA1 and turn the transistor TA1 on and off. When the transistor TA1 is controlled to be turned off and a leakage current occurs in the transistor TA1, the leakage current can be discharged to the ground node by the discharging circuit 20.

In the embodiment, the reverse protection circuit 30 includes the P-type transistor TB1 provided between the input-side node of the reverse protection circuit 30 and the charging node NBAT. The input-side node of the reverse protection circuit 30 is the output-side node NCSR of the charging circuit 10. The P-type transistor TB1 includes a parasitic diode whose forward direction is a direction from the input-side node of the charging circuit 10 to the charging node NBAT. For example, the parasitic diode is a diode between a P-type impurity region, which is the source of the P-type transistor TB1, and an N-type substrate or a well.

In this way, the charging current ICH from the charging circuit 10 flows from the output-side node NCSR to the charging node NBAT, and even in a state where the charging is stopped and the reverse protection circuit is enabled, a charge accumulated in the battery 2 can be controlled not to leak from the charging node NBAT to the output-side node NCSR. Therefore, the battery voltage VBAT can be prevented from being lowered due to discharge of the charge in the battery 2 after a full charge.

FIG. 4 shows an example of current values when a current IVIN flowing into the power supply node NIN and a current IVBAT flowing into the charging node NBAT are measured at several temperatures in a case where the battery 2 is charged with the circuit device 1 according to the embodiment. FIG. 4 shows an example of measured values of the currents when the power supply voltage VIN is 6 V and the battery voltage VBAT is 1.8 V, and shows current values at 85° ° C., 60° C., 40° C., and 25° ° C. from the top. Here, the current IVIN is a leakage current flowing into the power supply node NIN, and when charging is stopped, the current flows from the power supply node NIN toward the output-side node NCSR of the charging circuit 10, so that the current value of the current IVIN becomes a negative value. The current IVBAT is a leakage current flowing into the battery 2, and the current value of the current IVBAT during charging is a positive value. As shown in FIG. 4, the current values of the current IVIN and the current IVBAT increase as the temperature increases due to factors such as temperature dependence of a transistor threshold value. The values of the current IVIN and the current IVBAT are equal at any temperature. That is, it can be seen that almost all of the charge flowing out from the power supply node NIN flows into the battery 2 during charging.

FIG. 5 shows an example of current values of the current IVIN and the current IVBAT in a case where the output-side node NCSR is provided with a resistor having a resistance value of 12.5 kΩ when charging of the battery 2 is stopped. That is, data shown in FIG. 5 is an example of the current value of each current when a part of the charging current ICH supplied from the charging circuit 10 is discharged to the ground by the discharging circuit.

Two columns on the left side in FIG. 5 show currents when the power supply voltage VIN is 6 V and the battery voltage VBAT is 1.8 V. A magnitude of the current value of the current IVBAT is a fairly small negative value with respect to the current value of the current IVIN. That is, when the power supply voltage VIN is 6 V and the battery voltage VBAT is 1.8 V shown in the two columns on the left side in FIG. 5, no current flows into the battery 2, and a small amount of current flows out of the battery 2.

Two columns on the right side in FIG. 5 show currents when the power supply voltage VIN is 6 V and the battery voltage VBAT is 4.35 V. That is, an example of values of the current IVIN and the current IVBAT in a state where the battery 2 is fully charged, for example, is shown. The current value of the current IVIN is the same as that when the battery voltage VBAT is 1.8 V shown in the two columns on the left side in FIG. 5, but the current value of the current IVBAT increases compared to the current IVBAT shown in a second column from the left side in FIG. 5. Thus, when the battery 2 is fully charged, an absolute value of the current IVBAT increases compared to that when the battery voltage VBAT is 1.8 V, which corresponds to occurrence of charge leakage from the battery 2 in a state where the battery 2 is fully charged.

In the embodiment, a value of the resistor provided in the discharging circuit 20 is set based on a simulation result or the like under a condition in which a leakage current is most likely to occur in the transistor TA1 that controls charging in the charging circuit 10. The resistor provided in the discharging circuit 20 corresponds to a resistor RD in FIG. 6 to be described later. Specifically, the value of the resistor of the discharging circuit 20 is set to a resistance value such that the voltage VCSR at the output-side node NCSR through which the charging current ICH flows does not exceed the battery voltage VBAT under the condition in which the leakage current is most likely to occur in the transistor TA1 of the charging circuit 10.

2. Detailed Configuration Example

Figure 6:
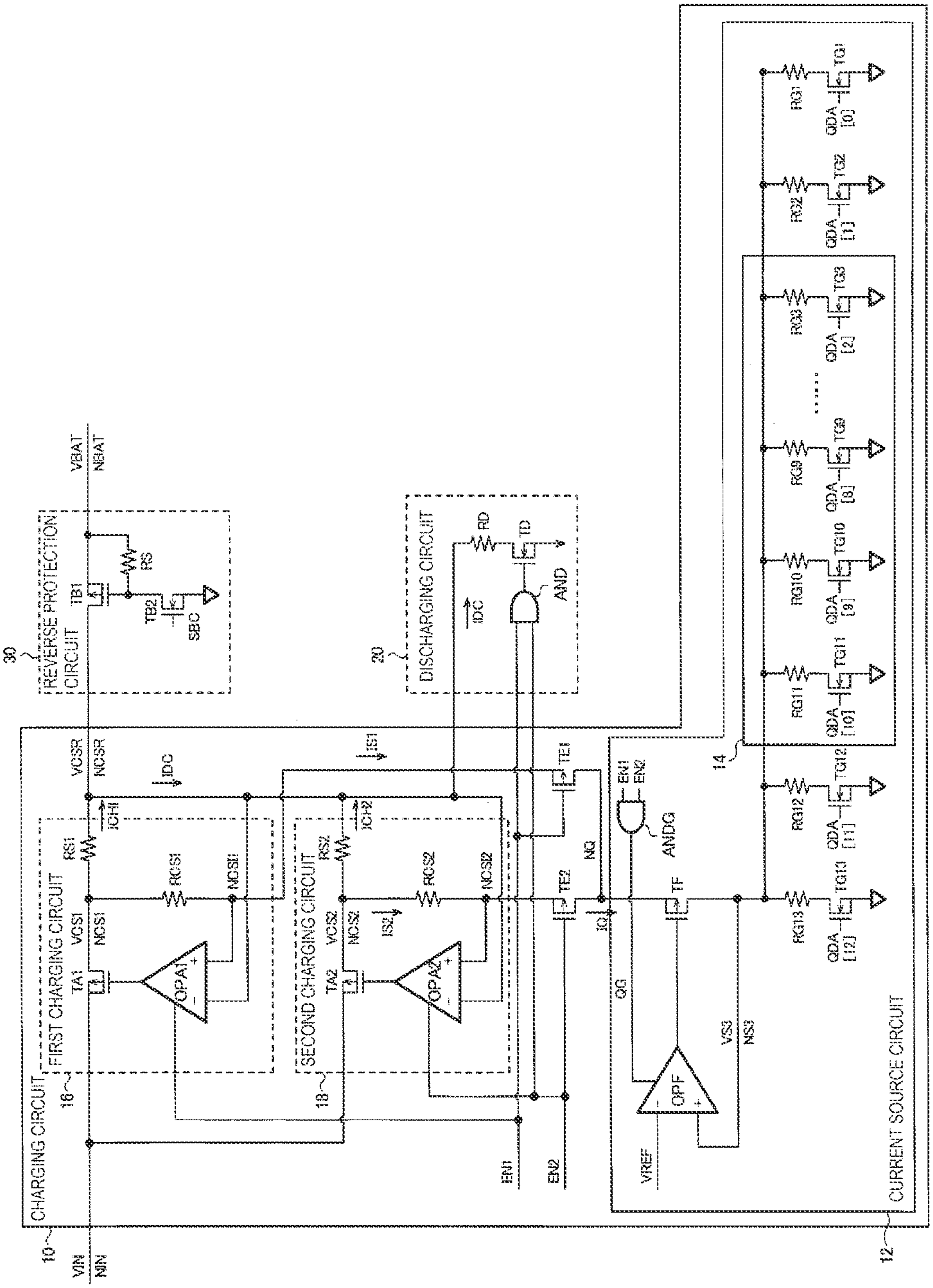
FIG. 6 is a circuit configuration example of a first detailed example according to the embodiment.

FIG. 6 is a circuit diagram of a first detailed example according to the embodiment. The first detailed example is an example in which the circuit device 1 shown in FIG. 3 is applied to a two-system charging circuit, and differs from the circuit device 1 shown in FIG. 3 mainly in the configuration of the charging circuit 10. In the charging circuit 10 described in FIG. 3, the amplifier circuit OPA1, the transistor TA1, and the resistors RCS1 and RS1 function as a charging circuit that supplies the charging current ICH to the output-side node NCSR. In the first detailed example shown in FIG. 6, the charging circuit 10 includes an amplifier circuit OPA2, a transistor TA2, and resistors RCS2 and RS2 in addition to the amplifier circuit OPA1, the transistor TA1, and the resistors RCS1 and RS1. In the first detailed example, a unit including the amplifier circuit OPA1, the transistor TA1, and the resistors RCS1 and RS1 is a first charging circuit 16, which supplies, for example, a high charging current to the output-side node NCSR. A unit including the amplifier circuit OPA2, the transistor TA2, and the resistors RCS2 and RS2 is a second charging circuit 18, which supplies, for example, a low charging current to the output-side node NCSR. In the first detailed example shown in FIG. 6, the high charging current supplied by the first charging circuit 16 is referred to as a first charging current ICH1, and the low charging current supplied by the second charging circuit 18 is referred to as a second charging current ICH2. In detailed examples to be described later in FIG. 7 and subsequent figures, similarly, the charging current supplied by the first charging circuit 16 is referred to as the first charging current ICH1, and the charging current supplied by the second charging circuit 18 is referred to as the second charging current ICH2.

Operations of the first charging circuit 16 and the current source circuit 12 in the first detailed example are the same as those of the charging circuit 10 described in FIG. 3. Basic operations of the second charging circuit 18 and the current source circuit 12 in the first detailed example are the same as those of the charging circuit 10 described in FIG. 3. That is, the charging current supplied by the first charging circuit 16 which is the first charging current ICH1 is expressed as (RCS1/RS1)×IS1, similarly to the charging current ICH described in FIG. 3. As shown in FIG. 6, a source of the P-type transistor TA2 is coupled to the power supply node NIN, and a drain thereof is coupled to a node NCS2. One end of the resistor RCS2 is coupled to the node NCS2, and the other end thereof is coupled to a node NCSI2. One end of the resistor RS2 is coupled to the node NCS2, and the other end thereof is coupled to the output-side node NCSR. A non-inverting input terminal of the amplifier circuit OPA2 is coupled to the node NCSI2, an inverting input terminal thereof is coupled to the output-side node NCSR, and a coupling node thereof is coupled to a gate of the P-type transistor TA2. The amplifier circuit OPA2 is enabled when a second enable signal EN2 is at a low level, and supplies the second charging current ICH2 as the current IVBAT to the charging node NBAT. The second charging current ICH2 is a current value (RCS2/RS2)×IS2 obtained by amplifying a second output current IS2 output from the current source circuit 12 by an amplification factor obtained by RCS2/RS2.

Although an outline of the current source circuit 12 has been described in FIG. 3, a detailed circuit configuration example is shown in FIG. 6. The current source circuit 12 supplies an output current set by a current source control value QDA to the first charging circuit 16 and the second charging circuit 18 based on the reference voltage VREF. As shown in FIG. 6, the current source circuit 12 includes an amplifier circuit OPF, a logic circuit ANDG, a P-type transistor TF, resistors RG1 to RG13, and N-type transistors TG1 to TG13.

The amplifier circuit OPF mainly controls an ON-current of the P-type transistor TF. The amplifier circuit OPF is controlled by a signal QG output from the logic circuit ANDG, and outputs a signal to a gate of the transistor TF based on input signals of an inverting input terminal and a non-inverting input terminal. Here, similarly to the amplifier circuits OPA1 and OPA2 described above, the amplifier circuit OPF is enabled when the input signal QG is at a low level. The first enable signal EN1 and the second enable signal EN2 are input to the logic circuit ANDG, and the logic circuit ANDG outputs an operation result of a logical product of these signals as the signal QG. The amplifier circuit OPF is operationally enabled when the input signal QG is at a low level, and controls the voltage applied to the gate of the transistor TF such that the reference voltage VREF input to the inverting input terminal of the amplifier circuit OPF and the voltage VS3 at a node NS3 input to the non-inverting input terminal are the same voltage. Accordingly, the voltage VS3 at the node NS3 on a drain side of the transistor TF is maintained at the reference voltage VREF when the amplifier circuit OPF is in an operation-enabled state. That is, when at least one of the first enable signal EN1 and the second enable signal EN2 is at a low level, either one of the amplifier circuits OPA1 and OPA2 is operationally enabled, and in this case, the signal QG, which is an operation result of a logical product in the logic circuit ANDG, is also at a low level and the amplifier circuit OPF is operationally enabled. When either one of the amplifier circuits OPA1 and OPA2 is operationally enabled, the amplifier circuit OPF is operationally enabled. Therefore, the node NS3, which is a drain node of the transistor TF, is set to the reference voltage VREF, and a current corresponding to a resistance value of a variable resistance circuit 14 can be generated.

Specifically, a source of the transistor TF is coupled to a node NQ, and a drain thereof is coupled to the node NS3. A non-inverting input terminal of the amplifier circuit OPF is coupled to the node NS3, and an output node of the amplifier circuit OPF is coupled to the gate of the transistor TF. The variable resistance circuit 14 includes the resistors RG1 to RG13 and the N-type transistors TG1 to TG13. One end of the resistor RG1 is coupled to the node NS3, and the other end thereof is coupled to a drain of the transistor TG1. A source of the transistor TG1 is coupled to a ground node. Similarly, one ends of the resistors RG2 to RG13 are coupled to the node NS3, and the other ends thereof are coupled to drains of the transistors TG2 to TG13. Sources of the transistors TG2 to TG13 are coupled to the ground node. Hereinafter, a bit signal of the current source control value QDA is referred to as a control bit signal. A control bit signal QDA[0] of the current source control value QDA is input to a gate of the transistor TG1. Similarly, control bit signals QDA[1] to QDA of the current source control value QDA are input to gates of the transistors TG2 to TG13.

When at least one of the first charging circuit 16 and the second charging circuit 18 supplies the charging current, the amplifier circuit OPF is operationally enabled, and the voltage of the node NS3 is VS3=VREF. The resistor RG1 and the transistor TG1 are referred to as a first current source of the current source circuit 12. When the control bit signal QDA[0] of the current source control value QDA is 1, the transistor TG1 is turned on, and a current of VREF/RG1 flows through the first current source. Similarly, the resistors RG2 to RG13 and the transistors TG2 to TG13 are referred to as second to thirteenth current sources of the current source circuit 12. When the control bit signals QDA[1] to QDA[12] of the current source control value QDA are 1, the transistors TG2 to TG13 are turned on, and currents of VREF/RG2 to VREF/RG13 flow through the second to thirteenth current sources. A current IQ flowing through the transistor TF is a sum of currents flowing from the current sources corresponding to the control bit signals which are 1 among the control bit signals QDA [0] to QDA of the current source control value QDA. Here, the number of current sources in the current source circuit 12 is 13, and the number of current sources in the current source circuit 12 may be an integer of 2 or more.

A transistor TE1 and a transistor TE2 are, for example, P-type transistors. A source of the transistor TE1 is coupled to the node NCSI1, and a drain thereof is coupled to the node NQ. A source of the transistor TE2 is coupled to the node NCSI2, and a drain thereof is coupled to the node NQ. When the first enable signal EN1 is at a low level, the transistor TE1 is turned on, and the current IQ flowing through the transistor TF flows to the node NCSI1 as the first output current IS1. When the second enable signal EN2 is at a low level, the transistor TE2 is turned on, and the current IQ flowing through the transistor TF flows to the node NCSI2 as the second output current IS2.

In this way, in the current source circuit 12, an operation of the amplifier circuit OPF is controlled based on the first enable signal EN1 and the second enable signal EN2, and currents corresponding to variable resistance values set based on the control bit signal QDA are supplied to each charging circuit as the first output current IS1 and the second output current IS2. As described above, the first charging circuit 16 generates the first charging current ICH1 determined by (RCS1/RS1)×IS1 based on the first output current IS1, the second charging circuit 18 generates the second charging current ICH2 determined by (RCS2/RS2)×IS2 based on the second output current IS2, and these currents are supplied to the battery 2.

That is, in the embodiment, the charging circuit 10 includes the first charging circuit 16 that generates the first charging current ICH1 and the second charging circuit 18 that generates the second charging current ICH2 smaller than the first charging current ICH1.

In this way, in the two-system circuit device 1 including two charging circuits that generate different current values, the leakage current occurred when the supply of each charging current is stopped can be discharged to the ground node via the discharging circuit 20.

That is, in the embodiment, the discharging circuit 20 discharges the leakage current when the first charging circuit 16 and the second charging circuit 18 are in a disabled state.

In this way, the first charging circuit 16 and the second charging circuit 18 are in the disabled state, and the battery 2 can be prevented from being overcharged by the leakage current from the first charging circuit 16 or the second charging circuit 18 in a state where neither the first charging current ICH1 nor the second charging current ICH2 is supplied to the battery 2.

Even in the circuit device 1 including two charging circuits, in order to implement a circuit capable of charging the battery 2 with a high charging current, it is necessary to reduce on-resistance of the P-type transistors TA1 and TA2 that control charging and on-resistance of the P-type transistor TB1 that prevents reverse flow such that a voltage can be efficiently applied to the battery 2. Examples of a method for reducing the on-resistance of the transistor include a method of reducing the channel length L and increasing the channel width W of the transistor. However, in such a case, the leakage current increases when the transistors such as the P-type transistors TA1 and TA2 are turned off, leading to overcharging of the battery 2, which may cause a failure to the battery 2. Therefore, by providing the discharging circuit 20 as in the embodiment, the leakage current, which increases due to reduced on-resistance of the P-type transistors TA1 and TA2 of the charging circuit, can be discharged to the discharging circuit 20, and the battery 2 can be prevented from being overcharged. Thus, the circuit device 1 according to the embodiment can be used as a countermeasure against leakage in the two-system charging circuit adapted to a high-rate charging circuit such as a hearing aid.

FIG. 6 shows a specific configuration example of the discharging circuit 20. The discharging circuit 20 includes the resistor RD and a transistor TD. The discharging circuit 20 may include a logic circuit AND. The resistor RD corresponds to a resistance circuit, and the transistor TD corresponds to a switch. A resistance value of the resistor RD is set to a resistance value that does not cause overcharging, as shown in FIGS. 4 and 5.

Figure 7:
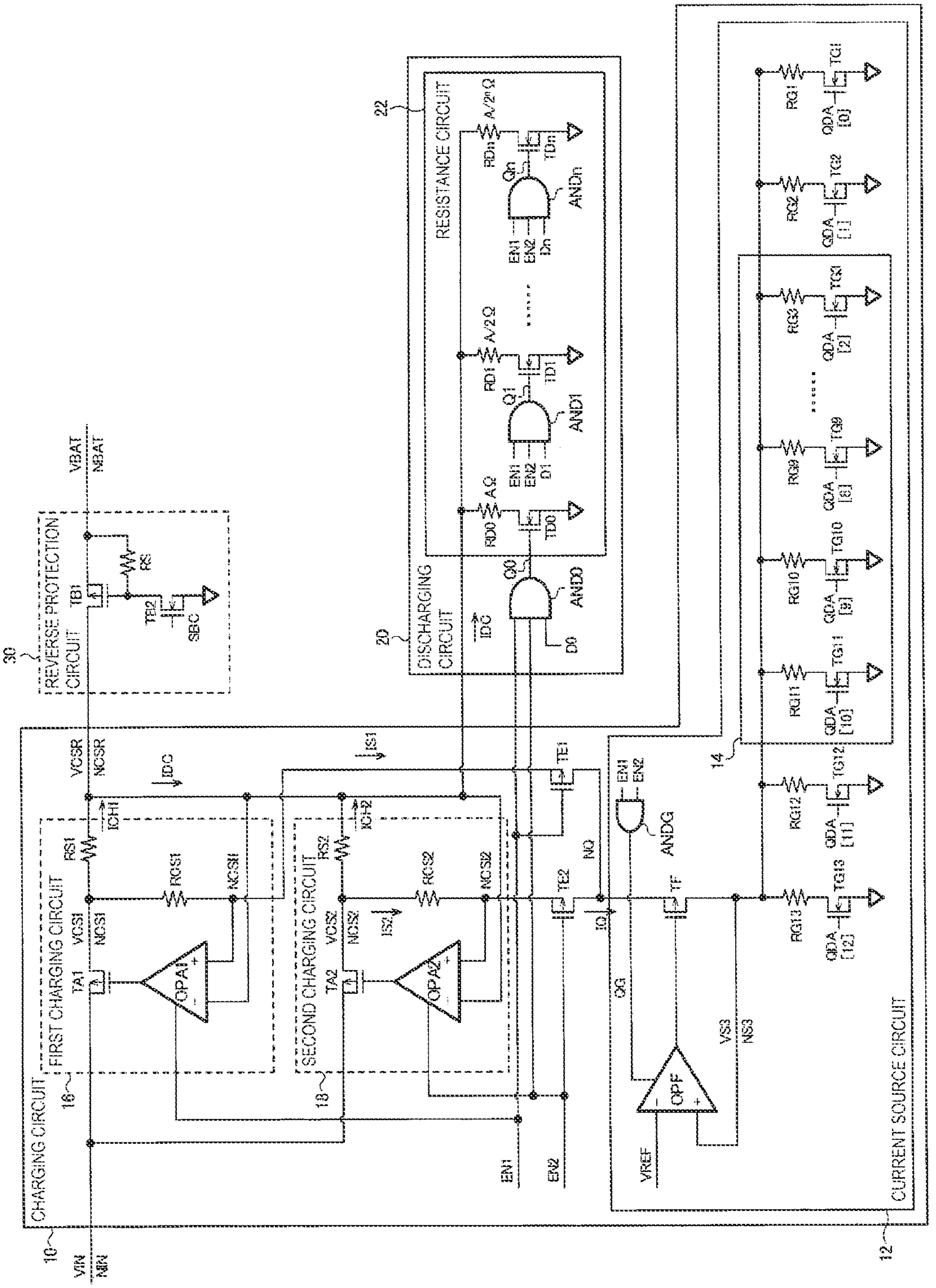
FIG. 7 is a circuit configuration example of a second detailed example according to the embodiment.

FIG. 7 is a circuit diagram of a second detailed example according to the embodiment. The second detailed example is an example in which the embodiment is applied to the configuration of the two-system charging circuit as in the first detailed example. The second detailed example is different from the first detailed example in the configuration of the discharging circuit 20, and the discharging circuit 20 includes a resistance circuit 22. In the resistance circuit 22, two or more resistors RD0 to RDn having different resistance values are provided in parallel, and the magnitude of the overall resistance value can be controlled by N-type transistors TD0 to TDn, which are switches.

Specifically, the resistors RD0 to RDn are provided in parallel, one ends of the resistors are coupled to the output-side node NCSR, and the other ends thereof are coupled to drains of the transistors TD0 to TDn. Sources of the transistors TD0 to TDn are coupled to a ground. Here, resistance values of the resistors RD0, RD1, . . . , and RDn are A Ω, A/2Ω, . . . , and $A/2^n\Omega$, respectively. That is, the resistance values of the resistors RD0, RD1, . . . , and RDn become smaller in this order, and currents that can be discharged also become larger. The N-type transistors TD1, TD2, . . . , and TDn are provided on ground node sides of the resistors RD0 to RDn, respectively. Gates of the N-type transistors TD1, TD2, and TDn are controlled by logic circuits AND0, AND1, . . . , and ANDn. That is, the transistors are provided as switches for controlling the resistors RD0 to RDn. For example, the logic circuit AND0 calculates a logical product of the first enable signal EN1, the second enable signal EN2, and a signal D0, and outputs the logical product to the gate of the N-type transistor TD0 which is a switch. Similarly, the logic circuit AND1 calculates a logical product of the first enable signal EN1, the second enable signal EN2, and a signal D1, and the logic circuit AND2 calculates a logical product of the first enable signal EN1, the second enable signal EN2, and a signal D2, and the logic circuit AND1 and the logic circuit AND2 output the logical products to the gates of the N-type transistors TD1 and TD2 which are switches, respectively. The logic circuit ANDn calculates a logical product of the first enable signal EN1, the second enable signal EN2, and a signal Dn, and outputs the logical product to the gate of the N-type transistor TDn. In this way, it is possible to set which of the resistors RD0 to RDn a current is to flow through by combining the signals DO to Dn. Therefore, the resistance value of the entire resistance circuit 22 can be changed by combining the resistors RD0 to RDn having different resistance values.

That is, in the embodiment, the discharging circuit 20 includes the resistance circuit 22 and the switch that are provided in series between the output side of the charging circuit 10 and the ground node.

In this way, the leakage current from the output of the charging circuit 10 can be discharged to the ground node via the resistor provided in the resistance circuit 22 of the discharging circuit 20. It is possible to set which resistor of the resistance circuit 22 is selected by turning the switch on or off, and to control the magnitude of the discharging current IDC discharged to the ground node. The resistance circuit 22 may be the resistor RD in FIG. 6.

That is, in the embodiment, the resistance circuit 22 is a variable resistance circuit.

In this way, an amount of the charge discharged from the output-side node NCSR to the ground node can be changed by changing the resistance value of the resistance circuit 22. Therefore, the amount of the charge discharged from the output-side node NCSR to the ground node can be controlled according to a voltage at the output-side node NCSR or an operating temperature.

That is, in the embodiment, the resistance value of the resistance circuit 22 is set to a resistance value such that, when the charging circuit is off, the battery 2 is fully charged, the operating temperature is at a maximum operating temperature, and the power supply voltage VIN is applied to the power supply node NIN, a voltage at the output of the charging circuit 10 is equal to or lower than the voltage of the battery at the time of full charge.

As described with reference to FIG. 5, an absolute value of the current IVIN increases as the temperature increases. As described above, the leakage current from the charging circuit 10 increases as the temperature increases. In FIG. 5, the current IVBAT corresponding to the charge flowing out of the battery 2 also increases when the battery voltage VBAT becomes 4.35 V and approaches the full charging voltage, compared to that when the battery voltage VBAT is 1.8 V. Therefore, when the battery 2 is fully charged, the operating temperature is the maximum, and the power supply voltage is applied to the power supply node NIN, the leakage current increases the most. In this state, the resistance value of the resistance circuit 22 is set to a resistance value such that the voltage VCSR at the output-side node NCSR can be lower than the battery voltage VBAT. In this way, even when the leakage current is the largest, it is possible to prevent the potential of the output-side node NCSR from increasing due to the leakage current, thereby preventing the battery 2 from being overcharged.

In this way, the resistance value of the resistance circuit 22 of the discharging circuit 20 is set such that the voltage VCSR at the output-side node NCSR can be maintained to be equal to or lower than the battery voltage VBAT of the battery at the time of full charge even in a situation where overcharging due to leakage from the charging circuit 10 is most likely to occur. Therefore, the battery 2 can be prevented from being overcharged.

Figure 8:
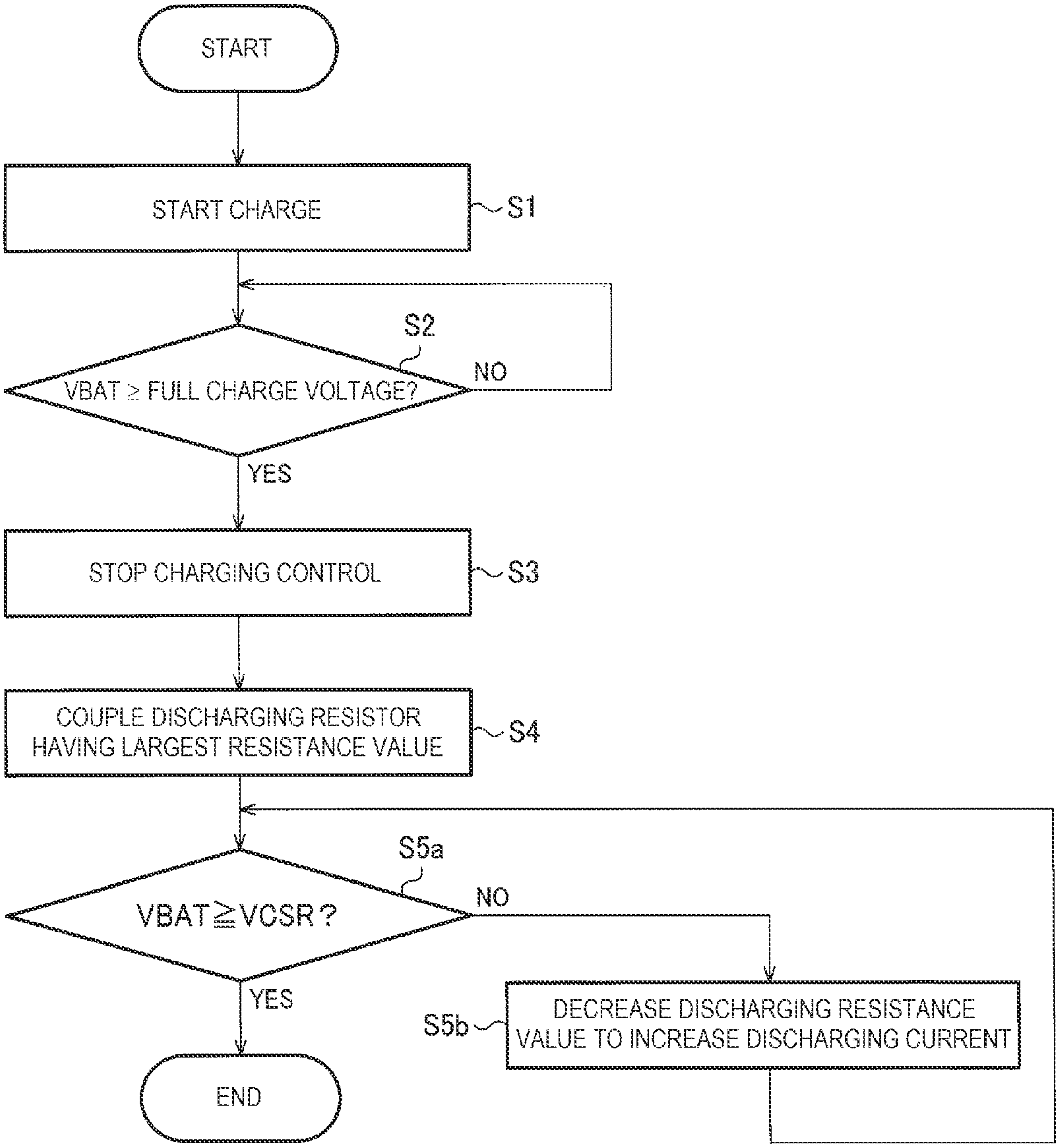
FIG. 8 is a flowchart showing processing when the second detailed example is applied.

FIG. 8 is a flowchart showing a processing example of charging and discharging in the second detailed example. The processing in FIG. 8 is controlled by, for example, the control circuit 50 in FIG. 2. First, charging is started in step S1. Specifically, charging of the battery 2 is started by the first charging circuit 16 or the second charging circuit 18 in the second detailed example shown in FIG. 7.

Next, in step S2, it is determined whether the battery 2 reaches a full charging voltage or higher. Specifically, it is determined whether the battery voltage VBAT at the charging node NBAT is equal to or higher than the full charging voltage. This determination can be made by the monitor circuit 40 described in FIG. 2 monitoring the voltage at the charging node NBAT. When the battery voltage VBAT is equal to or higher than the full charging voltage, the processing proceeds to step S3. When the battery voltage VBAT is not equal to or higher than the full charging voltage, the determination processing in step S2 is repeated until the battery voltage VBAT is equal to or higher than the full charging voltage.

In step S3, charging control is stopped. Specifically, as described above, both of the first enable signal EN1 and the second enable signal EN2 are at a high level, and the amplifier circuits OPA1 and OPA2 are in a disabled state. Accordingly, the transistor TA1 of the first charging circuit 16 and the transistor TA2 of the second charging circuit 18 are turned off, and the supply of the first charging current ICH1 and the second charging current ICH2 to the battery 2 is stopped.

In step S4, the control circuit 50 couples a discharging resistor having the largest resistance value. As described with reference to FIG. 7, in the second detailed example, the discharging circuit 20 includes the resistance circuit 22. For the resistor RD0, which is the resistor having the largest resistance value in the resistance circuit 22, when the N-type transistor TD0 is turned on, the output-side node NCSR and the ground node are coupled via the resistor RD0, and the discharging current IDC is discharged to the ground node via the resistor RD0. That is, when starting a discharging operation, the control circuit 50 first selects the largest resistor in the resistance circuit 22 and sets the discharging current IDC to the smallest current value.

In steps S5*a* and S5*b*, the monitor circuit 40 determines whether the voltage VCSR at the output-side node NCSR is equal to or lower than the battery voltage VBAT. In step S4, the control circuit 50 selects the resistor RD0 having the largest resistance value in the resistance circuit 22, and sets the discharging current IDC to the smallest current value. In step S5*a*, when the voltage VCSR at the output-side node NCSR is decreased to the battery voltage VBAT or lower due to the discharging current IDC having the smallest current value and selected in step S4, the control circuit 50 ends the present processing. When the voltage VCSR at the output-side node NCSR is not decreased to the battery voltage VBAT or lower, in step S5*b*, the control circuit 50 performs control to decrease the resistance value of the entire resistance circuit 22 and increase the discharging current IDC. Specifically, the control circuit 50 changes the resistor RD0 having the largest resistance value and selected in step S4 to, for example, the resistor RD1 having the second largest resistance in the processing in step S5*b*. Accordingly, the current value of the discharging current IDC can be increased to twice the current value set in step S4. By selecting any combination of the resistors RD1 to RDn, it is possible to finely adjust the current value of the discharging current IDC set in step S4. In this way, the control circuit 50 repeats the processing of decreasing the discharging resistance value in step S5*b* and the determination processing in step S5*a* until the voltage VCSR at the output-side node NCSR is equal to or lower than the battery voltage VBAT, and this processing ends when a relationship of VBAT≥VCSR is established.

That is, the circuit device 1 according to the embodiment includes the monitor circuit 40 and the control circuit 50. The monitor circuit 40 monitors the voltage VCSR on the output side of the charging circuit 10 and the battery voltage VBAT. The control circuit 50 sets the resistance value of the resistance circuit 22, which is a variable resistance circuit, based on the monitor result of the monitor circuit 40.

In this way, the monitor circuit 40 monitors the voltage VCSR on the output side of the charging circuit 10 and the battery voltage VBAT, the control circuit 50 decreases the resistance value of the resistance circuit 22 when the voltage VCSR at the output of the charging circuit 10 is higher than the battery voltage VBAT, and an amount of the charge discharged from the output-side node NCSR to the ground node can be changed, thereby adjusting the voltage at the output-side node NCSR.

In FIG. 8, there are various methods for adjusting the discharging current IDC shown in steps S4, S5*a*, and S5*b*. In the example in FIG. 8, the discharging current IDC is initially set to the smallest current value, and the discharging current IDC is gradually increased by changing the signals D0 to Dn one bit at a time. Alternatively, for example, the discharging current IDC may be initially set to the highest current value and gradually decreased by changing the signal D0 to Dn one bit at a time. That is, in step S4, only the resistor RDn, which is the discharging resistor having the smallest resistance value, is selected. Then, in steps S5*a* and S5*b*, the value of the discharging resistor is gradually increased to decrease the discharging current IDC.

There is also a method of adjusting the discharging current IDC by changing the signals D0 to Dn by several bits at a time. In this case, the resistance value of the resistance circuit 22 can be changed in a short time, and a time required until the voltage VCSR is equal to or higher than the battery voltage VBAT in step S5*a* is shortened. When the voltage VCSR is equal to or higher than the battery voltage VBAT in step S5*a*, the signals D0 to Dn are finely adjusted one bit at a time. In this way, the discharging current IDC can be set to an appropriate value in a short time. According to the method of adjusting the discharging current IDC as described above, the discharging current IDC corresponding to a temperature change and a process variation can be selected.

Figure 9:
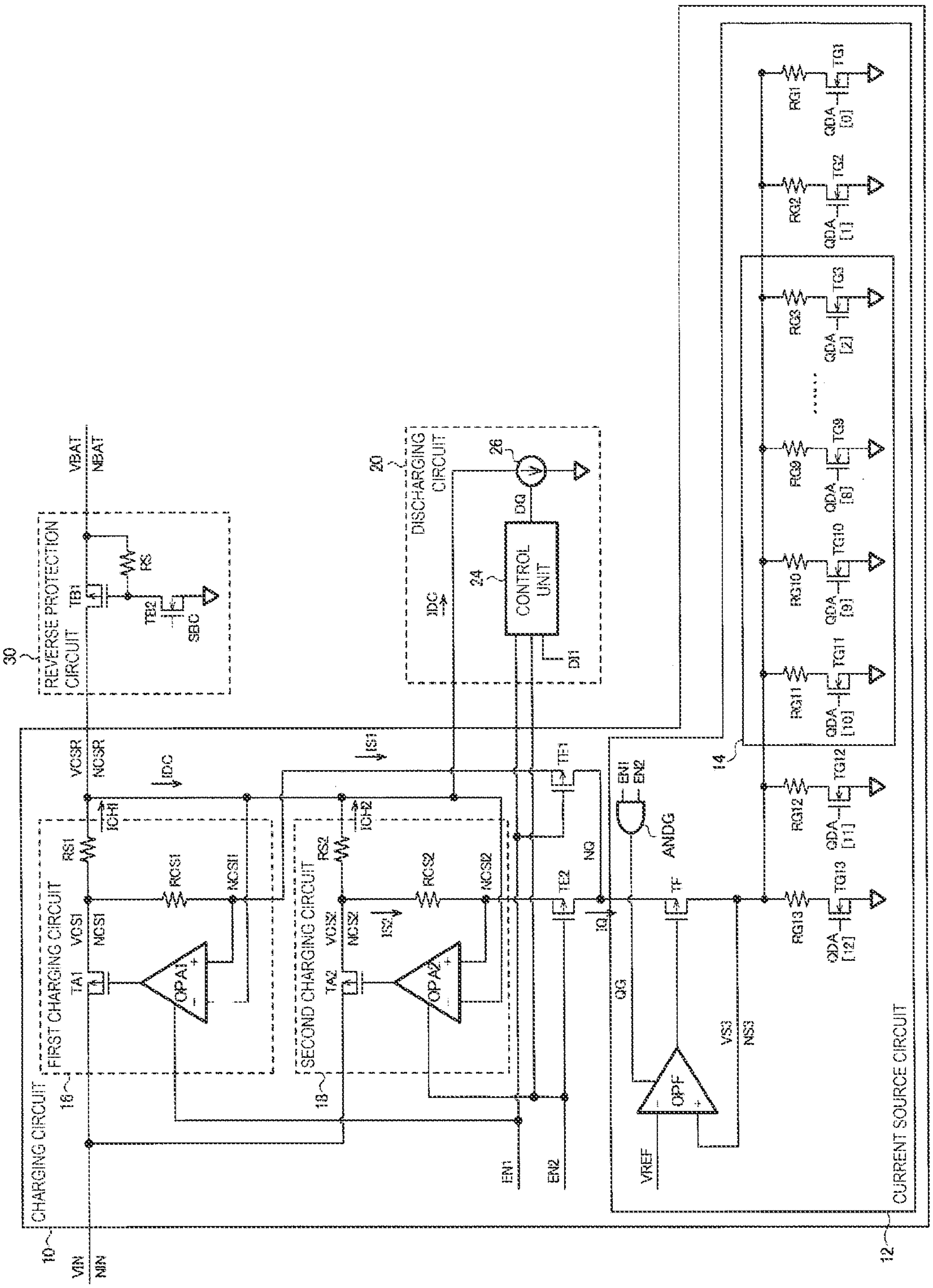
FIG. 9 is a circuit configuration example of a third detailed example according to the embodiment.

FIG. 9 is a circuit diagram of a third detailed example according to the embodiment. The third detailed example is different from the first detailed example shown in FIG. 6 in the configuration of the discharging circuit 20. Specifically, in the third detailed example, the discharging circuit 20 includes a control unit 24 and a current source circuit 26. In the third detailed example, by adjusting a value of a constant current generated by the current source circuit 26, the battery voltage VBAT and the voltage VCSR at the output-side node NCSR are controlled to be in a relationship VBAT≥VCSR. The current source circuit 26 generates a constant current IDC based on a signal DQ output from the control unit 24. The first enable signal EN1, the second enable signal EN2, and a signal DI1 are input to the control unit 24. The control unit 24 is enabled when the first enable signal EN1 and the second enable signal EN2 are at a high level, and the current source circuit 26 generates the constant current based on the signal DQ from the control unit 24. The value of the constant current generated by the current source circuit 26 is adjusted by the signal DI1 input to the control unit 24. As described above, in the third detailed example, the value of the constant current of the current source circuit 26 can be controlled by the signal DI1 input to the control unit 24. The signal DI1 input to the control unit 24 is, for example, a signal of two bits or more. The signal DI1 is output by the control circuit 50 in FIG. 2, for example.

That is, in the embodiment, the discharging circuit 20 includes the current source circuit 26 provided between the output of the charging circuit 10 and the ground node.

In this way, the leakage current leaking to the output side of the charging circuit 10 when the charging circuit 10 is turned off can be discharged to the ground node by the current source circuit 26.

In the embodiment, the current value of the current flowing from the current source circuit 26 is set to a current value such that, when the charging circuit 10 is off, the battery 2 is fully charged, the operating temperature is at a maximum operating temperature, and the power supply voltage VIN is applied to the power supply node NIN, a voltage at the output of the charging circuit 10 is equal to or lower than the voltage of the battery 2 at the time of full charge.

As described above, as the temperature increases, the leakage current from the charging circuit 10 increases, and when the battery voltage VBAT approaches the full charging voltage, the current IVBAT, which is the charge flowing out of the battery 2, also increases. Therefore, by causing a current under such a condition to flow through the current source circuit 26, it is ensured that the output voltage of the charging circuit 10 is equal to or lower than the battery voltage VBAT after the full charge even at the maximum temperature, and it is possible to prevent overcharging of the battery 2 due to the current flowing from the output of the charging circuit 10.

In the embodiment, the current source circuit 26 is a variable current source circuit.

In this way, the current flowing through the current source circuit 26 can be controlled by the signal DQ from the control unit 24, thereby controlling the discharging current IDC. Therefore, the current value of the constant current flowing through the current source circuit 26 can be adjusted such that the voltage VCSR at the output-side node NCSR is equal to or lower than the battery voltage VBAT.

Figure 10:
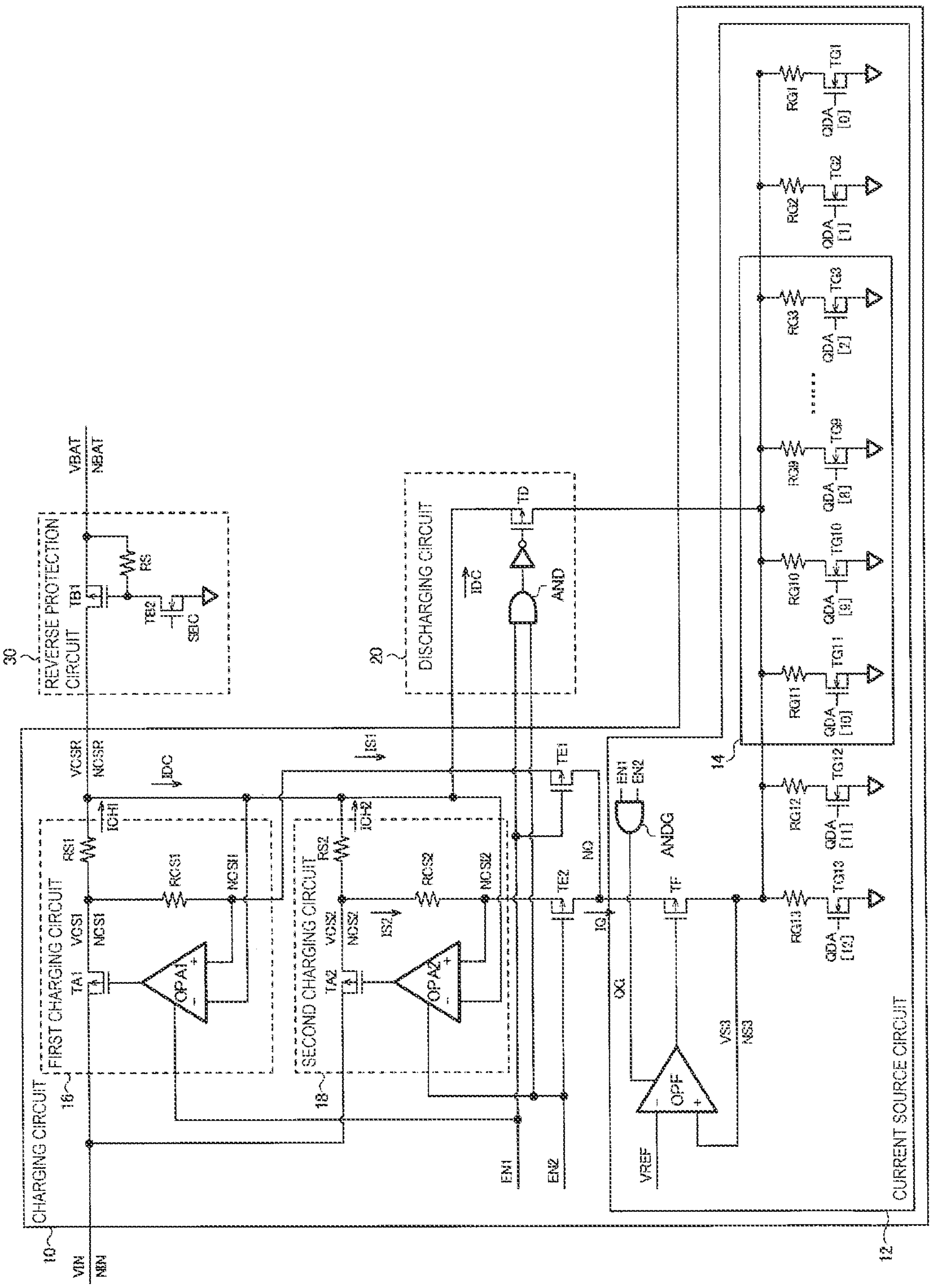
FIG. 10 is a circuit configuration example of a fourth detailed example according to the embodiment.

FIG. 10 is a circuit diagram of a fourth detailed example according to the embodiment. The fourth detailed example is different from the first detailed example shown in FIG. 6 in the configuration of the discharging circuit 20. Specifically, in the fourth detailed example, the discharging circuit 20 does not include the resistor RD, and the transistor TD is a P-type transistor. A drain of the P-type transistor TD is coupled to the variable resistance circuit 14 provided in the current source circuit 12 of the charging circuit 10. For example, a part of the variable resistance circuit of the current source circuit 12 is the variable resistance circuit 14. An inverter is provided between output of the logic circuit AND and a gate of the transistor TD.

In the fourth detailed example, adjustment of the current value of the discharging current IDC is performed by effectively using the variable resistance circuit 14 in the charging circuit 10 instead of the resistance circuit 22 in FIG. 7. When the discharging circuit 20 adjusts the current value of the discharging current IDC using the variable resistance circuit 14, the charging circuit 10 is in a disabled state. That is, the discharging circuit 20 uses only the variable resistance circuit 14 of the charging circuit 10 for adjusting the current value of the discharging current IDC. First, when both the first enable signal EN1 and the second enable signal EN2 are at a high level, the logic circuit AND outputs a high-level signal, the output signal is inverted by the inverter, and a low-level signal is input to the gate of the P-type transistor TD. The low-level signal turns on the transistor TD, and the output-side node NCSR is coupled to the variable resistance circuit 14. The resistors RG1 to RG13 provided in the variable resistance circuit 14 are set to either connected or disconnected by the control bit signals QDA[0] to QDA[12], respectively, as described in FIG. 6, thereby controlling the discharging current IDC to a desired current value. As described above, in the fourth detailed example, the current value of the discharging current is controlled using not a resistance element in the discharging circuit 20 but a resistance element provided in the current source circuit 12 in the charging circuit 10. Although all the resistors of the variable resistance circuit 14 are used here, a part of the variable resistance circuit may be used.

In the fourth detailed example, the transistor TD of the discharging circuit 20 serves as a switch and is controlled by the logic circuit AND and the inverter. The discharging current IDC flowing from the output-side node NCSR of the charging circuit 10 first flows to the discharging circuit 20, flows from the discharging circuit 20 to the variable resistance circuit 14 of the charging circuit 10, and is discharged to the ground node.

That is, in the embodiment, the discharging circuit 20 includes the switch. The switch and the variable resistance circuit 14 are provided in the charging circuit 10. The switch and the variable resistance circuit 14 are provided in series between a node on the output side of the charging circuit 10 and the ground node.

In this way, as in the second detailed example described with reference to FIG. 7, even when the resistance circuit 22 is not separately provided in the discharging circuit 20, the variable resistance circuit 14 provided in the charging circuit 10 to generate the first output current IS1 and the second output current IS2 can also be used as the resistance element for adjusting the current value of the discharging current IDC. Therefore, the circuit device 1 can be downsized.

Figure 11:
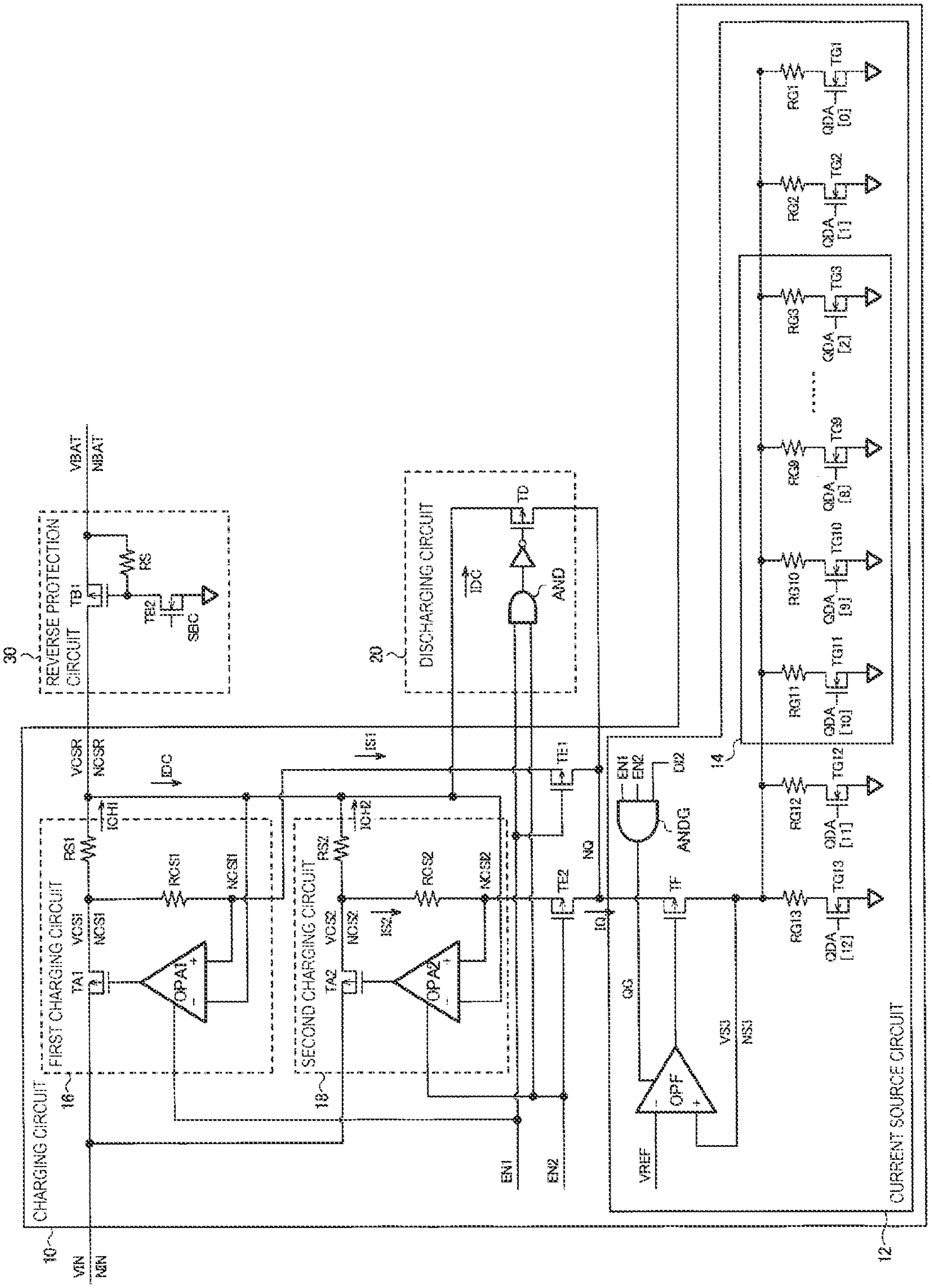
FIG. 11 is a circuit configuration example of a fifth detailed example according to the embodiment.

FIG. 11 is a circuit diagram of a fifth detailed example according to the embodiment. The fifth detailed example is different from the first detailed example in a method for adjusting the current value of the discharging current IDC of the discharging circuit 20. In the fifth detailed example, the current value of the discharging current IDC is adjusted using the current source circuit 12 of the charging circuit 10. In the fourth detailed example described in FIG. 10, adjustment of the current value of the discharging current IDC is performed using the variable resistance circuit 14 of the current source circuit 12. In the fifth detailed example is different form the fourth detailed example in that the adjustment of the current value of the discharging current IDC is performed also using the amplifier circuit OPF, the transistor TF, and the logic circuit ANDG that are provided in the current source circuit 12.

The discharging circuit 20 in the fifth detailed example includes the logic circuit AND, the inverter, and the P-type transistor TD as in the fourth detailed example. In the fifth detailed example, the drain of the transistor TD is coupled to the node NO of the charging circuit 10. Therefore, the discharging current IDC of the discharging circuit 20 flows through the transistor TF of the current source circuit 12 to the variable resistance circuit 14 via the node NS3. In the fifth detailed example, a signal DI2 is also input to the logic circuit ANDG of the current source circuit 12 in addition to the first enable signal EN1 and the second enable signal EN2. The signal DI2 is at a low level when the discharging circuit 20 is operationally enabled. Therefore, when the first enable signal EN1 and the second enable signal EN2 are at a high level and the charging circuit 10 is in a disabled state, the signal DI2 is at a low level, so that the logic circuit ANDG outputs a low-level signal. Therefore, the low-level signal QG is received from the logic circuit ANDG to the amplifier circuit OPF, and the current source circuit 12 in the charging circuit 10 is enabled. Here, a basic operation of the current source circuit 12 of the charging circuit 10 is similar to the case of the first detailed example described with reference to FIG. 6, but in the fifth detailed example, the current source circuit 12 operates to adjust the value of the discharging current IDC flowing to the discharging circuit 20. As described above, in the fifth detailed example, the current value of the discharging current IDC flowing through the discharging circuit 20 is controlled by the amplifier circuit OPF of the current source circuit 12 and the variable resistance circuit 14 of the current source circuit 12. The fifth detailed example is a method of maintaining the voltage at the charging node NBAT to be equal to or lower than the full charging voltage of the battery 2 using the current source circuit 12 as in the third detailed example. In addition to the third detailed example, the fifth detailed example can use the current source circuit 12 of the charging circuit 10, and thus a circuit scale can be reduced.

Figure 12:
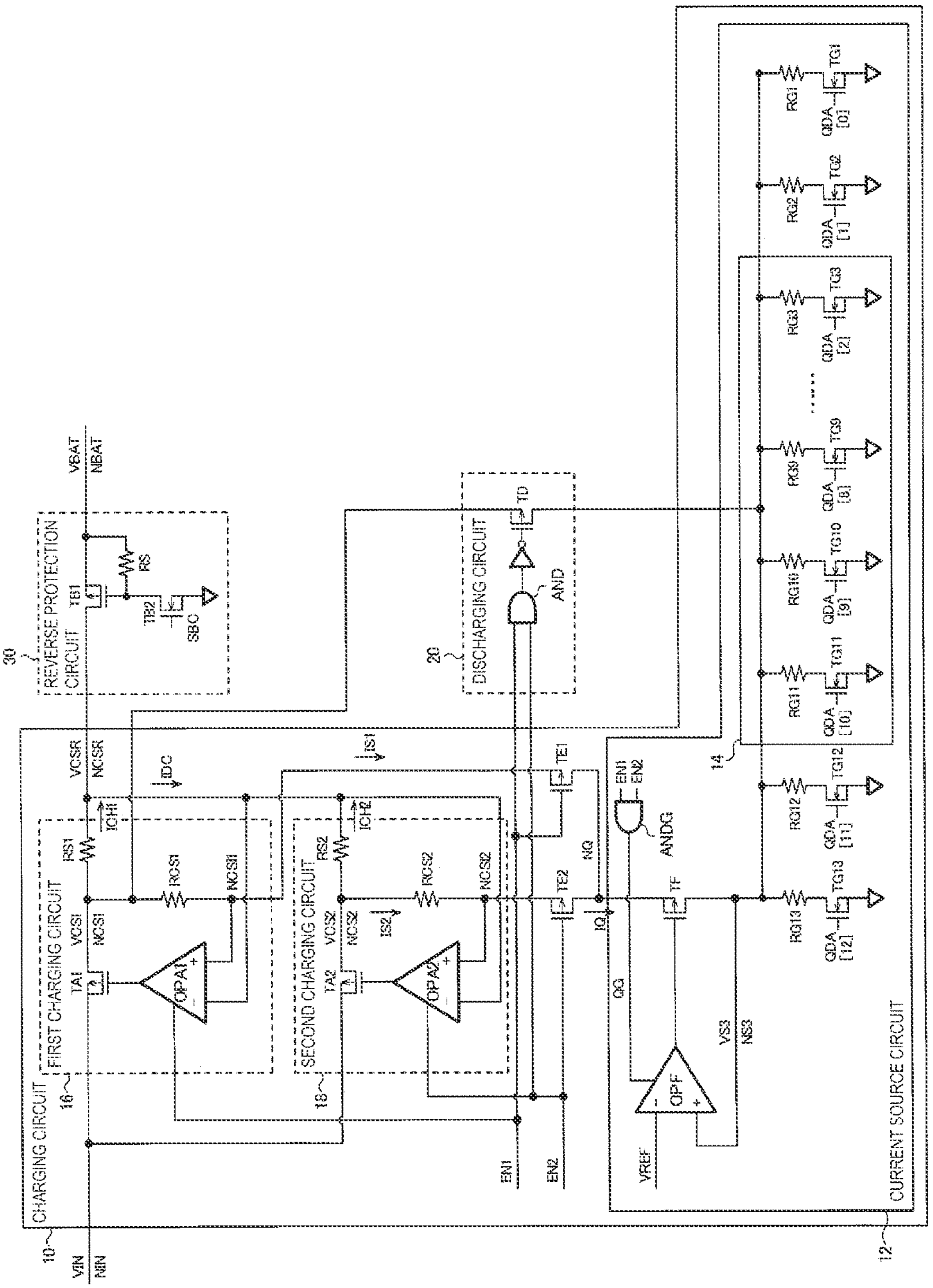
FIG. 12 is a circuit configuration example of a sixth detailed example according to the embodiment.

FIG. 12 is a circuit diagram of a sixth detailed example according to the embodiment. The sixth detailed example basically has the same circuit configuration as the fourth detailed example according to the embodiment described with reference to FIG. 10. The sixth detailed example is different from the fourth detailed example in that a current path of the discharging current IDC is coupled to the node NCS1 instead of a node of the NCSR. In this case, the node NCS1 is the output-side node of the charging circuit 10. In this way, as in the fourth detailed example, the charge flowing to the node NCS1, which is the output-side node, can be discharged to the ground node by the discharging circuit 20. As described above, in the embodiment, the discharging circuit 20 may be coupled to the node of the NCSR or the node of the NCS1 as the output-side node of the charging circuit 10. The change in the output-side node of the discharging circuit 20 described with reference to FIG. 12 can also be applied to a configuration example other than the fourth detailed example. The same effect can be attained by coupling the discharging circuit 20 to a node of the node NCS2.

As shown in FIGS. 1 and 2, an electronic device 100 according to the embodiment may include the circuit device 1 described above and the battery 2. In this way, in the electronic device 100, overcharging of the battery 2 due to the leakage current described above can also be prevented.

As described above, a circuit device according to the embodiment includes a charging circuit and discharging circuit. The charging circuit is configured to supply a charging current to a battery based on a power supply voltage from a power supply node. The discharging circuit is provided on an output side of the charging circuit, and is configured to discharge a leakage current leaking from the power supply node to the output side of the charging circuit when supply of the charging current is off.

According to the embodiment, the battery is charged by supplying the charging current to the battery during charging, and when the charging is stopped, the leakage current from the charging circuit is discharged by the discharging current of the discharging circuit, so that the voltage at the output-side node is prevented from exceeding the battery voltage. Therefore, the battery can be prevented from being overcharged due to the leakage current from the charging circuit.

In the embodiment, the discharging circuit may discharge the leakage current after a full charge of the battery is detected.

In this way, when it is detected that the battery voltage becomes the predetermined full charging voltage, the discharging circuit can discharge the leakage current from the charging circuit. Therefore, when the battery is not yet fully charged, the battery can be charged with a constant current to the predetermined full charging voltage, and control can be implemented to prevent overcharging from occurring when the charging is completed.

The circuit device according to the embodiment may further include a reverse protection circuit provided between the charging circuit and the battery and configured to prevent reverse flow from the battery to the charging circuit. The discharging circuit may be coupled to an input-side node of the reverse protection circuit.

In this way, the reverse protection circuit provided between the charging circuit and the battery can prevent a current in a direction opposite to the charging current from flowing from the battery to the output-side node of the charging circuit.

In the embodiment, the reverse protection circuit includes a P-type transistor provided between the input-side node of the reverse protection circuit and a charging node. The input-side node of the reverse protection circuit is the output-side node of the charging circuit. The reverse protection circuit may include the P-type transistor and a parasitic diode whose forward direction is a direction from the input-side node of the charging circuit to the charging node.

In this way, the parasitic diode can execute control such that the charging current from the charging circuit flows from the output-side node to the charging node and the charge accumulated in the battery does not leak from the charging node to the output-side node.

In the embodiment, the discharging circuit may set a voltage on the output side of the charging circuit to be equal to or lower than a battery voltage by discharging the leakage current.

In this way, the voltage at the charging node is prevented from increasing to be higher than the battery voltage by discharging the leakage current from the charging circuit. Therefore, the voltage at the charging node can be maintained to be equal to or lower than the battery voltage, and the battery can be prevented from being overcharged.

In the embodiment, the discharging circuit may include a resistance circuit and a switch that are provided in series between the output side of the charging circuit and a ground node.

In this way, the leakage current from the output of the charging circuit can be discharged to the ground node via the resistor provided in the resistance circuit of the discharging circuit by turning the switch from off to on.

In the embodiment, the resistance value of the resistance circuit can be set to a resistance value such that, when the charging circuit is off, the battery is fully charged, an operating temperature is a maximum operating temperature, and the power supply voltage is applied to the power supply node, a voltage at output of the charging circuit is equal to or lower than a voltage of the battery at a time of full charge.

In this way, the resistance value of the resistance circuit provided in the discharging circuit is set such that the voltage at the output-side node of the charging circuit can be maintained to be equal to or lower than the voltage of the battery at the time of full charge even in a situation where the overcharging due to leakage from the charging circuit is most likely to occur. Therefore, the battery can be prevented from being overcharged.

In the embodiment, the resistance circuit may be a variable resistance circuit.

In this way, by changing the resistance value of the resistance circuit, which is the variable resistance circuit, the amount of the charge discharged from the output-side node of the charging circuit can be made variable. Therefore, the amount of the charge discharged from the output-side node can be controlled according to the voltage at the coupling node and the operating temperature.

The circuit device according to the embodiment may further include a monitor circuit and a control circuit. The monitor circuit may monitor the voltage on the output side of the charging circuit and the voltage of the battery, and the control circuit may set a resistance value of the variable resistance circuit based on a monitor result of the monitor circuit.

In this way, the monitor circuit monitors the voltage on the output side of the charging circuit and the battery voltage, and when the voltage at the output of the charging circuit is higher than the voltage of the battery, the control circuit decreases the resistance value of the resistance circuit to increase the amount of charge discharged from the output-side node, thereby adjusting the voltage at the output-side node.

In the embodiment, the discharging circuit may further include a current source circuit provided between output of the charging circuit and a ground node.

In this way, the leakage current leaking to the output side of the charging circuit when the charging circuit is turned off can be discharged to the ground node by the current source circuit.

In the embodiment, a current value of a current flowing from the current source circuit may be set to a current value such that, when the charging circuit is off, the battery is fully charged, an operating temperature is a maximum operating temperature, and a power supply voltage is applied to the power supply node, a voltage at the output of the charging circuit is equal to or lower than a voltage of the battery at a time of full charge.

By causing a current under such a condition to flow through the current source circuit, it is ensured that the output voltage of the charging circuit is equal to or lower than the battery voltage after the full charge even at the maximum temperature, and it is possible to prevent overcharging of the battery due to the current flowing from the output of the charging circuit.

In the embodiment, the current source circuit may be a variable current source circuit.

In this way, the current value of the constant current flowing through the current source circuit can be adjusted such that the voltage at the coupling node is equal to or lower than the battery voltage.

In this way, the current flowing through the current source circuit is controlled by the signal from the control unit, thereby controlling the discharging current. Therefore, the current value of the constant current flowing through the current source circuit can be adjusted such that the voltage at the output-side node is equal to or lower than the battery voltage.

In the embodiment, the discharging circuit may include a switch, and the switch and a variable resistance circuit provided in the charging circuit may be provided in series between a node on the output side of the charging circuit and a ground node.

In this way, even when the resistance circuit is not separately provided in the discharging circuit, the variable resistance circuit provided in the charging circuit to generate the output current can also be used as the resistance circuit for adjusting the current value of the discharging current.

In the embodiment, the charging circuit may include a transistor provided between the power supply node and output of the charging circuit, and an amplifier circuit configured to control a gate voltage of the transistor. When supply of the charging current is turned off, the transistor may be turned off, and the discharging circuit may discharge the leakage current leaking from the power supply node to the output of the charging circuit via the transistor being off.

In this way, the amplifier circuit can control the gate voltage of the transistor and turn the transistor on and off. When the transistor is controlled to be turned off and a leakage current occurs in the transistor, the leakage current can be discharged by the discharging circuit.

In the embodiment, the charging circuit may include a first charging circuit configured to generate the first charging current and a second charging circuit configured to generate a second charging current smaller than the first charging current.

In this way, in the two-system circuit device including two charging circuits that generate different current values, the leakage current occurred when the supply of each charging current is stopped can be discharged via the discharging circuit.

In the embodiment, the discharging circuit may discharge the leakage current when the first charging circuit and the second charging circuit are in a disabled state.

In this way, the battery can be prevented from being overcharged by the leakage current from the first charging circuit or the second charging circuit when the first charging circuit and the second charging circuit are in the disabled state and no charging current is supplied to the battery.

The electronic device according to the embodiment may include the circuit device described above and the battery.

In this way, it is possible to implement an electronic device capable of preventing overcharging of a battery due to a leakage current.

Although the embodiment is described in detail above, it can be easily understood by those skilled in the art that a number of modifications are possible without substantially departing from the novel matters and effects of the disclosure. Accordingly, all such modifications are within the scope of the disclosure. For example, a term described at least once together with a different term having a broader meaning or the same meaning in the description or the drawings can be replaced with the different term at any place in the description or the drawings. All combinations of the embodiment and the modifications are also included in the scope of the disclosure. The configurations, operations, and the like of the circuit device, and the electronic device are not limited to those described in the embodiment, and various modifications can be made.

What is claimed is:

1. A circuit device comprising:
- a charging circuit configured to supply a charging current to a battery based on a power supply voltage from a power supply node; and
- a discharging circuit provided on an output side of the charging circuit, wherein
- the discharging circuit is configured to discharge a leakage current leaking from the power supply node to the output side of the charging circuit when supply of the charging current is off.

2. The circuit device according to claim 1, wherein
- the discharging circuit discharges the leakage current after a full charge of the battery is detected.

3. The circuit device according to claim 1, further comprising:
- a reverse protection circuit provided between the charging circuit and the battery and configured to prevent reverse flow from the battery to the charging circuit, wherein
- the discharging circuit is coupled to an input-side node of the reverse protection circuit.

4. The circuit device according to claim 3, wherein
- the reverse protection circuit includes a transistor provided between the input-side node and a charging node, and
- the transistor includes a parasitic diode whose forward direction is a direction from the input-side node to the charging node.

5. The circuit device according to claim 1, wherein
- the discharging circuit sets a voltage on the output side of the charging circuit to be equal to or lower than a battery voltage by discharging the leakage current.

6. The circuit device according to claim 1, wherein
- the discharging circuit includes a resistance circuit and a switch that are provided in series between the output side of the charging circuit and a ground node.

7. The circuit device according to claim 6, wherein
- a resistance value of the resistance circuit is set to a resistance value such that, when the charging circuit is off, the battery is fully charged, an operating temperature is a maximum operating temperature, and a power supply voltage is applied to the power supply node, a voltage at output of the charging circuit is equal to or lower than a voltage of the battery at a time of full charge.

8. The circuit device according to claim 6, wherein
- the resistance circuit is a variable resistance circuit.

9. The circuit device according to claim 8, further comprising:
- a monitor circuit configured to monitor the voltage on the output side of the charging circuit and the voltage of the battery; and
- a control circuit configured to set a resistance value of the variable resistance circuit based on a monitor result of the monitor circuit.

10. The circuit device according to claim 1, wherein
- the discharging circuit includes a current source circuit provided between output of the charging circuit and a ground node.

11. The circuit device according to claim 10, wherein
- a current value of a current flowing through the current source circuit is set to a current value such that, when the charging circuit is off, the battery is fully charged, an operating temperature is a maximum operating temperature, and a power supply voltage is applied to the power supply node, a voltage at the output of the charging circuit is equal to or lower than a voltage of the battery at a time of full charge.

12. The circuit device according to claim 10, wherein
- the current source circuit is a variable current source circuit.

13. The circuit device according to claim 1, wherein
- the discharging circuit includes a switch, and
- the switch and a variable resistance circuit provided in the charging circuit are provided in series between a node on the output side of the charging circuit and a ground node.

14. The circuit device according to claim 1, wherein
- the charging circuit includes
  - a transistor provided between the power supply node and output of the charging circuit, and
  - an amplifier circuit configured to control a gate voltage of the transistor, and
- when supply of the charging current is off, the transistor is off, and the discharging circuit discharges the leakage current leaking from the power supply node to the output of the charging circuit via the transistor being off.

15. The circuit device according to claim 1, wherein the charging circuit includes a first charging circuit configured to generate a first charging current, and a second charging circuit configured to generate a second charging current smaller than the first charging current.

16. The circuit device according to claim 15, wherein the discharging circuit is configured to discharge the leakage current when the first charging circuit and the second charging circuit are in a disabled state.

17. An electronic device comprising:

the circuit device according to claim 1; and the battery.

* * * * *